(12) United States Patent
Herchick

(10) Patent No.: US 6,557,687 B1
(45) Date of Patent: May 6, 2003

(54) CLUTCH ASSEMBLY AND DIAGNOSTIC SYSTEM

(75) Inventor: Robert E. Herchick, Copley, OH (US)

(73) Assignee: Power Transmission Technology, Inc.

( * ) Notice: Subject to any disclaimer, the term of this patent is extended or adjusted under 35 U.S.C. 154(b) by 27 days.

(21) Appl. No.: 09/887,601

(22) Filed: Jun. 22, 2001

Related U.S. Application Data

(63) Continuation-in-part of application No. 09/357,488, filed on Jul. 20, 1999.

(51) Int. Cl.$^7$ .............................................. F16D 23/00
(52) U.S. Cl. ............................... 192/104 F; 192/18 A; 192/82 T; 192/103 F; 74/11; 74/15.6
(58) Field of Search ...................... 192/103 R, 104 F, 192/103 F, 82 T, 18 A; 74/11, 15.6, 15.63, 15.66; 477/174, 175

(56) References Cited

U.S. PATENT DOCUMENTS

| | | | | |
|---|---|---|---|---|
| 4,081,065 A | * | 3/1978 | Smyth et al. ................ | 477/175 |
| 4,488,625 A | * | 12/1984 | Nobumoto et al. ...... | 192/103 R |
| 4,799,160 A | * | 1/1989 | Arbeille et al. ............ | 192/3.58 |
| 4,828,082 A | * | 5/1989 | Brand et al. .............. | 192/103 F |
| 4,830,155 A | * | 5/1989 | Ohkumo et al. ......... | 192/103 R |
| 4,834,226 A | * | 5/1989 | Ohkumo et al. ......... | 192/103 C |
| 4,867,287 A | * | 9/1989 | Hayashi ................... | 192/103 R |
| 5,293,316 A | * | 3/1994 | Slicker ........................ | 477/86 |
| 5,489,012 A | * | 2/1996 | Buckley et al. ............. | 192/3.63 |
| 5,601,172 A | * | 2/1997 | Kale et al. .................. | 180/273 |
| 6,223,874 B1 | * | 5/2001 | Wheeler ................. | 192/103 F |
| 6,227,999 B1 | * | 5/2001 | Wheeler ....................... | 477/174 |

* cited by examiner

Primary Examiner—Saul Rodriguez
(74) Attorney, Agent, or Firm—Renner, Kenner, Greive, Bobak, Taylor & Weber

(57) ABSTRACT

A process for achieving engagement of a power source with a high inertia load by use of a clutch provides for the sequential engagement of the clutch until the speed of the power source drops to a first threshold, at which time the clutch is disengaged until the speed of the power source recovers to a second threshold. The process is repeated until the power source operates above the first threshold for a set period of time. The process may be terminated, leaving the clutch either engaged or disengaged, after a certain number of sequential attempts at engagement and disengagement have been made, or after a certain period of time has elapsed. The invention also relates to a system and associated process by which a microprocessor obtains various data regarding the operational state of a power source, load, and a clutch interposed therebetween. The data includes the speed of the power source and pressure, temperature and filter conditions of the associated clutch. The microprocessor also communicates with an ignition switch for the power source, a clutch engagement switch, and an equipment safety switch associated with the load. The system obtains the effective engagement of the load to the power source and the maintenance of that engagement while monitoring and recording operational data relevant to the effectiveness and efficiency of the system and the operational characteristics of the operator.

8 Claims, 10 Drawing Sheets

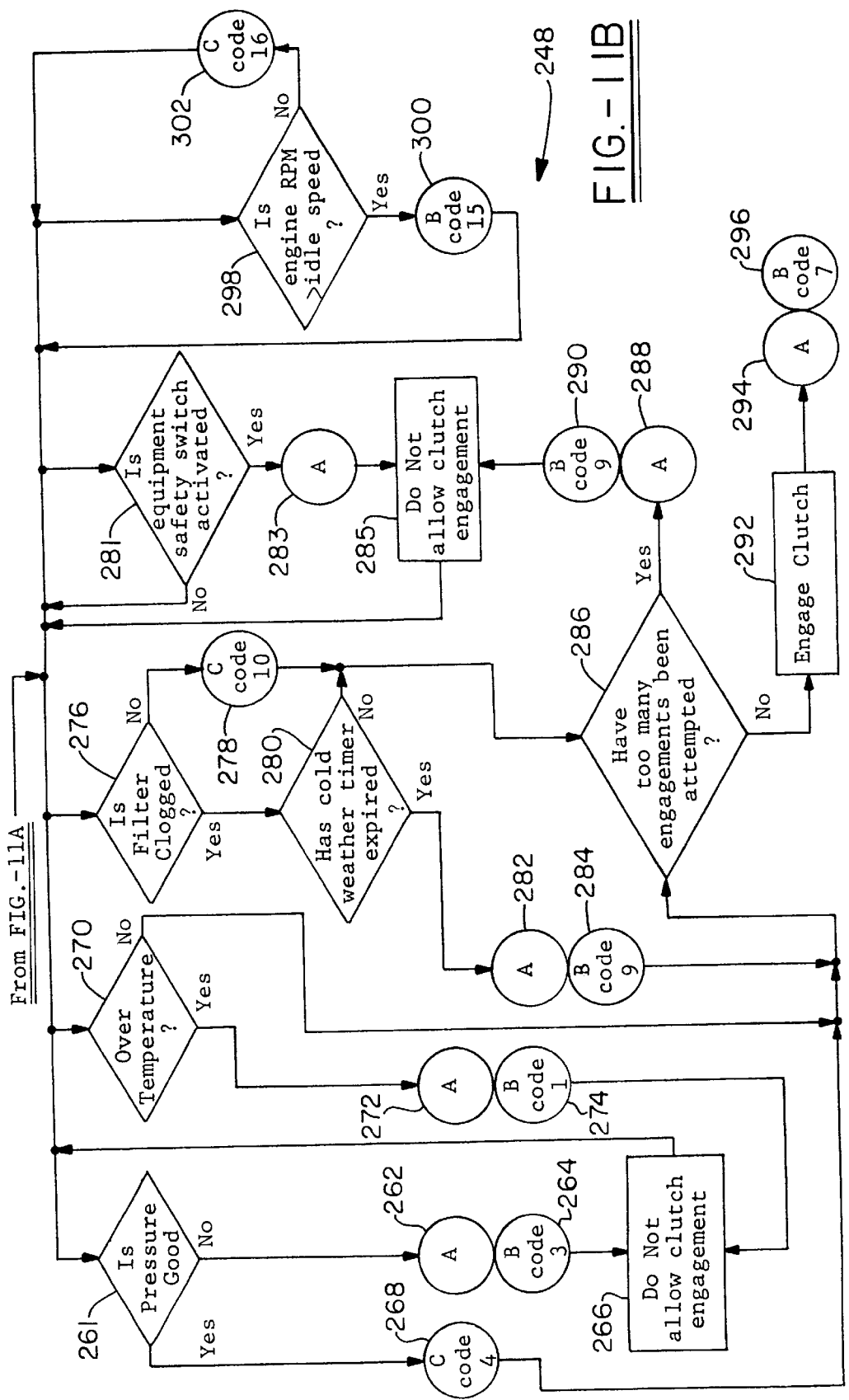

CLUTCH ASSEMBLY AND DIAGNOSTIC SYSTEM

CROSS REFERENCE TO RELATED APPLICATION

This is a continuation-in-part of application Ser. No. 09/357,488, for "Hydraulically Actuated Power Takeoff Clutch Assembly," filed Jul. 20, 1999.

TECHNICAL FIELD

The invention herein resides in the art of power transmission devices and, more particularly, to couplers between a power source and a power driven implement. More particularly, the invention relates to power takeoff units. Specifically, the invention relates to a power takeoff clutch assembly adapted for controlled engagement and having a diagnostic system for monitoring and assessing its use and operation.

BACKGROUND OF THE INVENTION

The use of clutches of various types to couple power from a power source such as an engine to auxiliary pieces of equipment is commonly known. Presently, over center mechanical engine clutches are often used to couple the flywheel of an engine to an auxiliary piece of equipment. Such clutches suffer from a number of problems, including pilot bearing failures, excessive wear, frequent adjustment and maintenance and operator abuse while attempting to achieve engagement when the clutch is coupling the engine with a high inertia load such as crushers and hammer mills. Indeed, in view of the state of the prior art, there is a need for a hydraulically actuated, wet multiple disk clutch to serve as a power takeoff unit between an engine and a high inertia load. Moreover, there is a need in the art for such a power takeoff unit which can serve as a torque limiter, while also providing a means for driving auxiliary hydraulic pumps. Further, there remains a need in the art for such a power takeoff unit which may easily and effectively be engaged to connect a high inertia load.

There is further a need in the art for a technique and apparatus for engaging power sources with high inertia loads in a prompt and efficient manner, without stalling or otherwise overloading the power source.

Moreover, it is presently known in the power transmission industry that industrial diesel engines can be used to power rotary cutter heads on equipment such as grinders, shredders, and chippers for the waste recycling market. It is also well known in the industry, that some form of power transmission device is required to interface between the engine and the driven equipment. It is customary to classify such a power transmission device as a clutching device; such as a hydraulic, pneumatic, or electrically actuated engagement device. That is to say a "clutch" is classified as a device for engaging and disengaging an engine to a driven load. These clutches typically suffer damage and abuse caused by harsh duty cycles and operator actions and/or lack of response. With no means for monitoring such duty cycles and operator actions, manufacturers are left without knowledge of the cause of many failures and are thus unable to remedy recurring problems. Additionally, such manufacturers are often unable to distinguish between failures resulting from design or manufacturing shortcomings and those resulting from operator abuse.

Accordingly, there is a need in the art for a diagnostic system implemented with a power source and power takeoff unit that can monitor the operational activities of both, and which can record and assess associated operator actions.

DISCLOSURE OF INVENTION

In light of the foregoing, it is a first aspect of the invention to provide a hydraulically actuated power takeoff clutch unit in which the input end of the clutch thereof is rigidly and directly coupled to the engine flywheel, without the need for bearing support of the clutch input.

Still a further aspect of the invention is the provision of a hydraulically actuated power takeoff clutch unit which includes a gear on the input of the clutch assembly which may be employed to drive hydraulic pumps for powering auxiliary equipment, or for actuating the hydraulically actuated power takeoff clutch unit itself.

Yet another aspect of the invention is the provision of a hydraulically actuated power takeoff clutch unit which provides for ease of removal of a clutch module while allowing the remainder of the unit to stay secured to the engine itself, thus allowing for servicing of the clutch assembly without removal of the entirety of the power takeoff clutch unit and pump drives from the engine.

Yet a further aspect of the invention is the provision of a hydraulically actuated power takeoff clutch unit which employs an automatic brake structure which retards rotation of the output shaft except when the clutch is engaged.

Still another aspect of the invention is the provision of a hydraulically actuated power takeoff clutch unit which employs a rotary union for coupling hydraulic, cooling and lubricating fluids to the clutch assembly.

Still a further aspect of the invention is to provide a hydraulically actuated power takeoff clutch unit which is electronically controlled so as to achieve effective start-up and controlled operation.

Yet a further aspect of the invention is to provide a hydraulically actuated power takeoff clutch unit which is reliable and durable in operation, readily constructed from state of the art components, and readily adapted to implementation with existing equipment.

Another aspect of the invention is the provision of a power takeoff clutch assembly and diagnostic system in which engagement of the clutch, whether hydraulic, pneumatic, mechanical or electrical, is attained through sequential steps, providing increased opportunity for engagement to occur without stalling the power source.

A further aspect of the invention is the provision of a power takeoff clutch assembly and diagnostic system in which various operational parameters involving the clutch and associated power source are continually monitored and assessed to detect operational failures and their causes and prevent the same.

The foregoing and other aspects of the invention which will become apparent as the detailed description proceeds are achieved by a method for operationally interconnecting a power source and a load through a clutch, comprising: engaging the clutch; monitoring the speed of the power source; and sequentially disengaging the clutch if the speed of the power source drops below a first threshold and re-engaging the clutch if the speed of the power source exceeds a second threshold.

Other aspects of the invention are attained by a method for controlling and monitoring the operative interengagement of a power source and load through a clutch, comprising: sensing the speed of the power source; sensing the oil pressure and temperature of the clutch; and controlling the engagement and disengagement of the clutch as a function of said speed, oil pressure and temperature.

DESCRIPTION OF THE DRAWINGS

For a complete understanding of the objects, techniques and structure of the invention reference should be made to the following detailed description and accompanying drawings wherein:

FIG. 11, comprising FIGS. 11A and 11B, is a flow chart of the diagnostic and control system of the invention prior to clutch engagement.

BEST MODE FOR CARRYING OUT THE INVENTION

Figure 1:
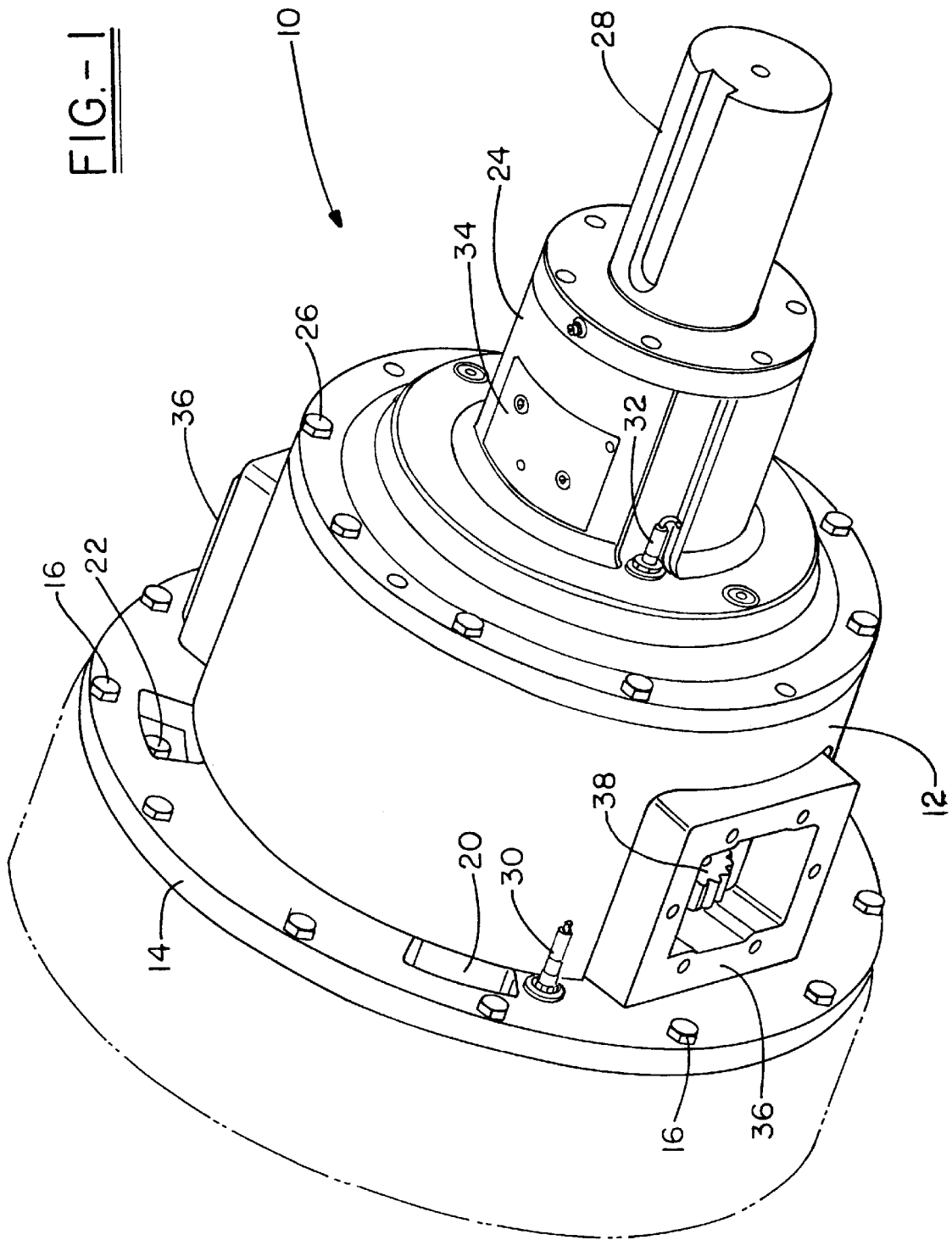
FIG. 1 is a perspective view of the external structure of the hydraulic power takeoff assembly according to invention.

Referring now to the drawings and more particularly FIG. 1, it can be seen that a hydraulically actuated power takeoff clutch assembly according to the invention is designated generally by the numeral 10. The assembly 10 includes a cylindrical housing 12 received by an annular disk-shaped housing adapter 14 which, in turn, is secured by bolts 16 to a flywheel housing 18. It will be appreciated by those skilled in the art that the flywheel housing 18 is part and parcel of an appropriate drive engine or other power source and retains therein a flywheel to be discussed later herein.

The housing adapter 14 is characterized by a plurality of openings 20 providing exposure to bolts 22 employed for securing the hydraulic power takeoff assembly 10 to the engine flywheel as will be discussed below.

An end cover or bearing cover 24 is secured to the cylindrical housing 12 by bolts 26 or other suitable fasteners. Extending from the bearing cover 24 is a power output shaft 28 which may be secured to any appropriate implement to be coupled to an engine by the hydraulically actuated power takeoff clutch assembly 10. One specific adaptation of the instant invention is to drive a tub grinder thereby.

It will be appreciated that the hydraulically actuated power takeoff clutch assembly 10 is uniquely adapted for electronic control and/or monitoring, and is further configured to receive and drive an auxiliary hydraulic pump or the like. In this regard, an input speed sensor or transducer 30 is received by the housing adapter 14 and communicates with the engine flywheel to monitor the input speed to the assembly 10 from the flywheel. It will be appreciated that the speed sensor 30 may simply be the tachometer or speed sensor of the engine itself. Such instantaneous speed is presented as an electrical output signal by the transducer 30. In like manner, an output speed sensor or transducer 32 may also be provided in association with the assembly 10 and in communication with the output shaft 28 to provide an electrical signal corresponding to the instantaneous rotational speed of the output shaft 28. The output signals from the transducers 30, 32 are received and employed by a controller in a manner to be discussed herein.

As also shown in FIG. 1, a mounting pad 34 is provided for receipt of actuation and lubrication valves for communication through a rotary union to the clutch assembly of the hydraulic power takeoff assembly 10. While the invention contemplates that such valves may be received directly upon the mounting pad 34, it is also contemplated that the valves may be maintained separate and apart from the assembly 10. Also contemplated as a part of the instant invention are gear pump drive mounting pads 36, each providing access to an idler gear assembly 38, driven by the input to the clutch unit of the hydraulically actuated power takeoff clutch assembly 10, as will be discussed below. In other words, each of the pads 36 may receive a hydraulic pump and drive assembly effectively driven by the input to the hydraulically actuated power takeoff clutch assembly 10, such hydraulic pumps being used to drive auxiliary equipment or to be used for the source of power actuation of the clutch of the assembly 10, itself.

Figure 2:
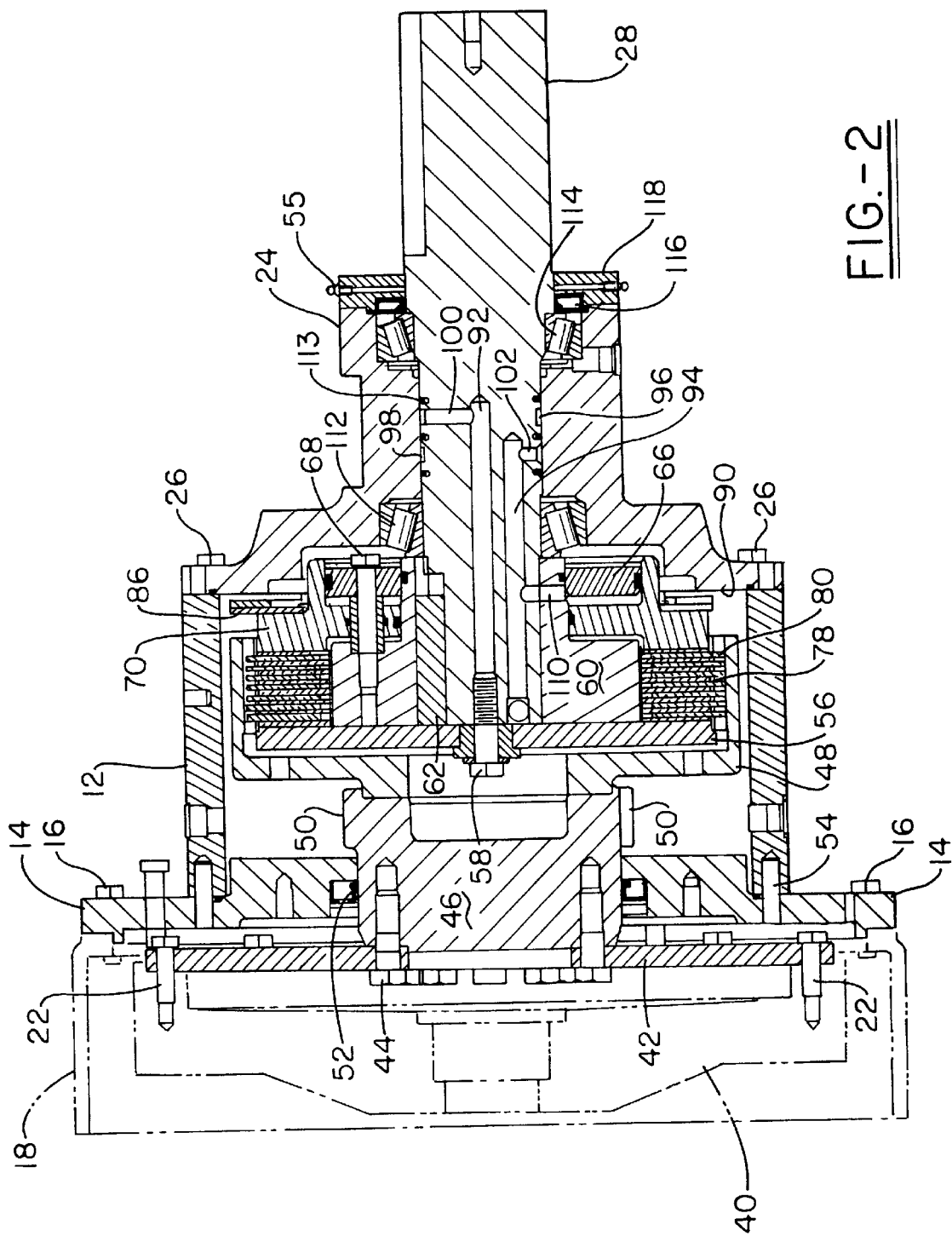
FIG. 2 is a central cross sectional view of the hydraulic power takeoff assembly of FIG. 1.

Referring now to FIG. 2, it can be seen that a flywheel 40 of an associated engine or appropriate power source is maintained within the housing 18 thereof and is secured by means of bolts 22 to a rigid adapter plate 42. In turn, the adapter plate 42 is secured by bolts 44 directly to a clutch input hub 46. Lockingly secured to the input hub 46, by bolts or other appropriate means, is a clutch cup 48. It will be appreciated that the clutch hub 46 and cup 48 are preferably integral, but are formed separately and secured together for purposes of manufacturing convenience.

As just presented, flywheel 40 is connected directly to the input hub 46 through a rigid adapter plate 42, and without any bearings or other support interface between the flywheel 40 and the hydraulic power takeoff assembly 10. In effect, the assembly 10 employs the bearings and support structure of the flywheel 40 and associated engine, rather than employing bearings and support structure internal to the assembly 10, to support the input and save both space and cost.

Figure 8:
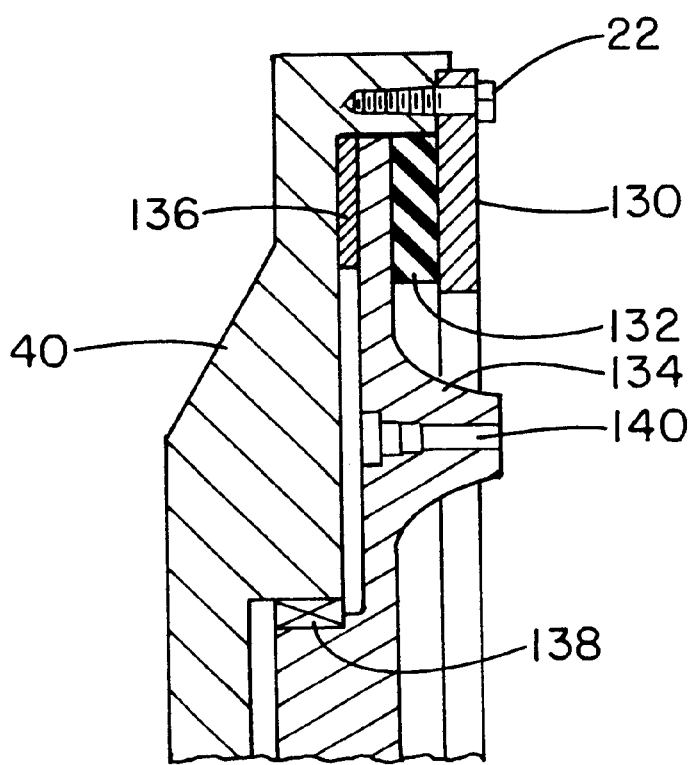
FIG. 8 is a cross sectional view of a torsionally absorptive adapter plate according to the invention.

As shown in FIG. 8, the rigid adapter plate 42 may be replaced with an adapter plate that is rigid in all respects, except torsionally, to absorb vibrations characteristic of certain applications. This alternative coupling includes a compression plate 120 that bolts to the engine flywheel. This plate 130 compresses an elastomeric ring of material 132 against the adapter plate 134 which has a ring of friction material 136 bonded to it to create a resistive torque against the flywheel 40. This resistive torque absorbs vibration energy when high vibration or torque reversals are experienced in the coupling. The compressive forces of the elastomeric material 132 also maintain the squareness of the adapter plate 134 to the flywheel 40 to take the drive loads. The adapter plate 134 has a bearing 138 that fits into the standard pilot bearing bore of the flywheel to maintain concentricity of the adapter plate and restrain the loads from the drives. Thus the coupling is rigid in all respects except torsionally. As shown, bolts 140 or appropriate fasteners secure the adapter plate 134 to the clutch input hub 46.

Figure 3:
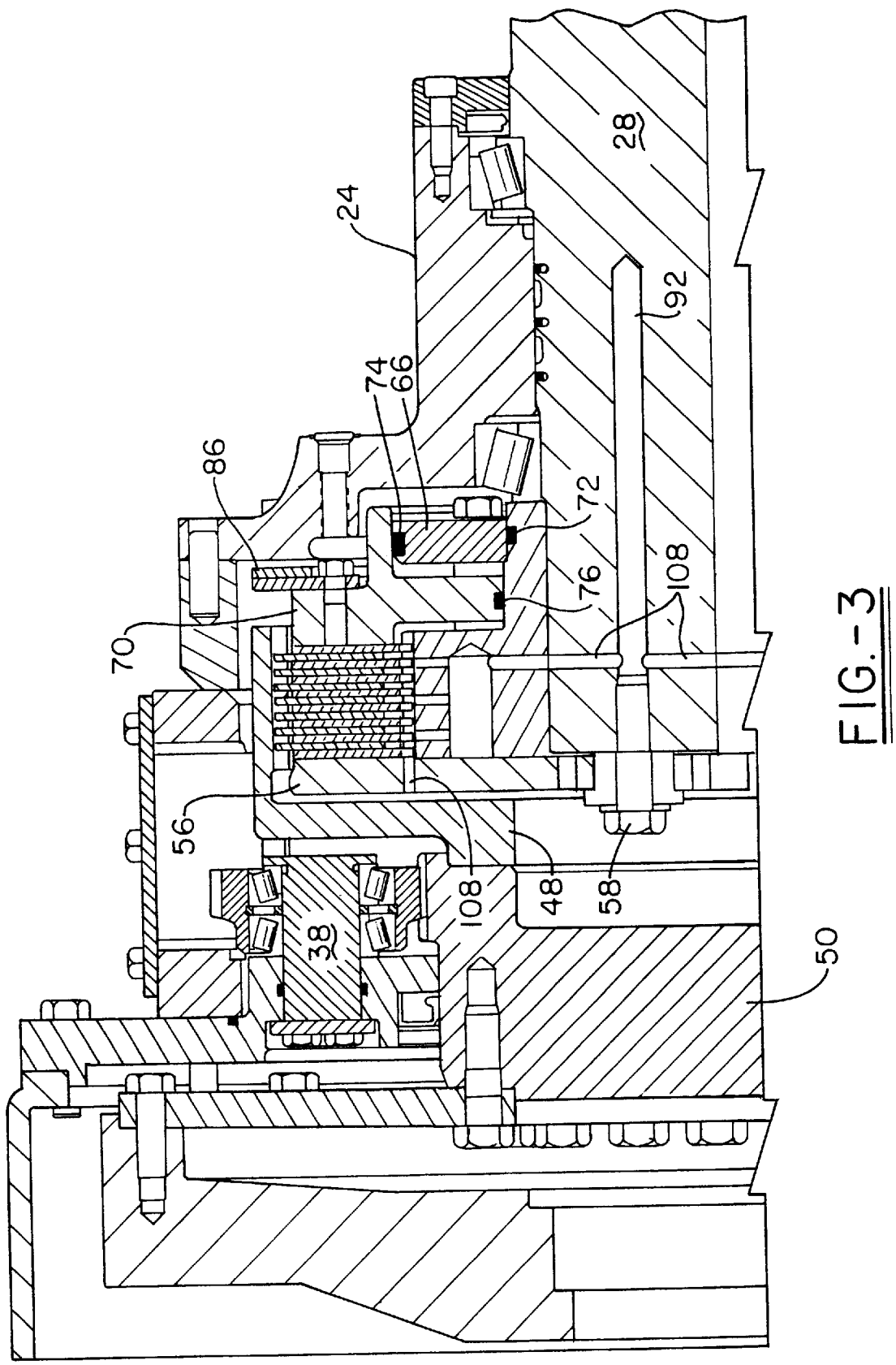
FIG. 3 is a partial cross sectional view of the hydraulic power takeoff assembly according to the invention.

As further shown in FIG. 2, input hub 46 is characterized by a plurality of circumferential gear teeth 50 such that the hub 46 operates as a gear to engage the idler gear assemblies 38 (best shown in FIGS. 1 and 3). Accordingly, the idler gear assemblies 38 are driven by an input tied directly to the flywheel 40 of the engine and are thus available to directly drive hydraulic pumps or the like mounted to the pads 36. These pumps may be employed to control auxiliary hydraulic equipment or as a power source for engaging the clutch of the assembly 10, as will be apparent below.

As further shown, an appropriate seal 52 is interposed between the housing adapter and clutch input hub 46. Additionally, dowel pins 54 are provided for securing the cylindrical housing 12 to the housing adapter plate 14, as illustrated. An end plate 56 is received within the clutch cup 48 and is secured by bolts 58 to the output shaft 28. An output hub 60 is received upon the output shaft 28 and is keyed thereto by an appropriate key 62. Accordingly, the output hub 60 is operative to rotationally drive the output shaft 28.

A backplate 66 is secured to the output hub 60 by means of bolts or cap screws 68, as shown. A piston or pressure plate 70 is interposed between the output hub 60 and back plate 66 and is operative to actuate the clutch of the assembly 10 in a manner to be presented directly below.

As best shown in FIG. 3, a plurality of O-ring seals 72, 74, 76 are interposed between the backplate 66, piston 70 and output hub 60 for purposes of sealing the hydraulic fluid employed to actuate the clutch from the lubrication fluid of the wet clutch assembly.

As shown in FIG. 2, the clutch of the hydraulically actuated power takeoff clutch assembly 10 is configured of a plurality of alternatingly interleaved friction plates or disks 78 and separator plates or disks 80. In the preferred embodiment of the invention, the friction disks 78 are keyed or splined to the output hub 60, while the separator disks 80 are keyed or splined to the clutch cup 48. As will be appreciated by those skilled in the art, when hydraulic pressure is applied to the piston or pressure plate 70 in the annular cavity defined between the backplate 66 and piston 70, the piston 70 urges the disks 78, 80 of the clutch stack together, thus engaging the clutch and causing the output shaft 28 and flywheel 40 to rotate together, and at the same rotational speed.

Figure 4:
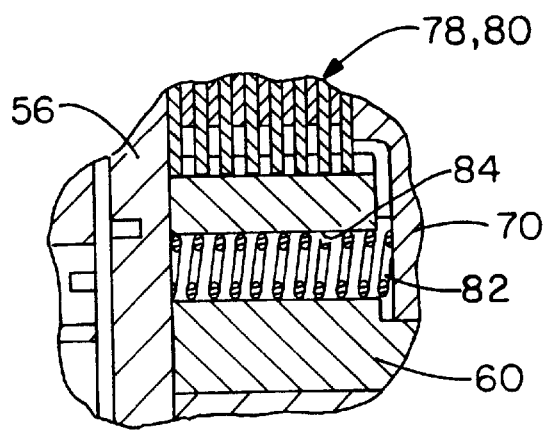
FIG. 4 is a partial cross sectional view of the hydraulic power takeoff assembly according to the invention, and showing the return spring mechanism for the clutch thereof.

When hydraulic pressure against the piston 70 is released, it is desired that the clutch disengage and that the interleaved friction and separator disks 78, 80 be relatively freewheeling. To achieve this separation and return of the piston 70, return springs are employed. As shown in FIG. 4, return springs 82 are received within bores 84 within the output hub 60 and extend between the end plate 56 and piston 70. The return springs 82 urge the pistons 70 toward the backplate 66 and into a position of disengagement of the clutch. Accordingly, when hydraulic pressure is released from the backside of the piston 70, the return springs 82 urge the piston away from the clutch stack 78, 80, allowing the disks thereof to become freewheeling and resulting in clutch disengagement. While the invention herein is discussed with respect to hydraulic actuation and control, it will be appreciated that pneumatic actuation and control would be employed in the context of the invention, as well.

It is most desirable that there be no incidental or inadvertent rotation of the output shaft 28 when the piston 70 is not engaging the stack 78, 80. Indeed, it has been found that in a wet clutch assembly, the viscosity of the lubricating oil within the stack itself is, at certain low temperatures, sufficient to effect passive engagement of the clutch such that some rotation of the output shaft 28 may occur. To prevent this inadvertent rotation, the instant invention contemplates the utilization of an annular brake disk 86 secured by cap screws 88 to the backside of the piston 70, as shown. When the clutch is not engaged, the return springs 82 urge the piston 70 toward the backplate 66 and to a point where the annular brake disk 86 frictionally engages an inside annular flat surface 90 of the bearing cover 24. Accordingly, the piston 70 is braked when the clutch is disengaged. With the piston 70 being secured by the cap screw 68 to the output hub 60, any inadvertent or incidental rotation of the output shaft 28 is retarded. In other words, the braking of the piston 70 effects braking of the output shaft 28.

With the clutch of the hydraulically actuated power takeoff clutch assembly 10 being a hydraulically actuated wet clutch, the invention requires means for conveying lubrication, cooling and actuation fluid from the housing or casing of the assembly 10 to the interior thereof. In this regard, a bore 92 for conveying lubrication and cooling fluid is axially configured in the output shaft 28. Similarly, a bore 94 for conveying actuation fluid is defined in the output shaft in parallel relationship with the bore 92. Circumferential grooves 96, 98 are provided about the output shaft 28 in spaced apart relationship, as shown. The groove 96 communicates through a radial inlet bore 100 with the lubrication and cooling bore 92, while the circumferential groove 98 communicates through a radial inlet bore 102 with the hydraulic actuation bore 94.

Figure 5:
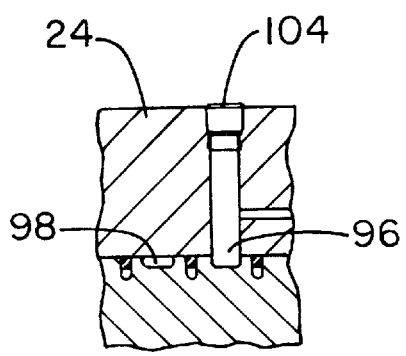
FIG. 5 is a partial cross sectional view of the rotary union inlet for lubrication of the clutch assembly of the invention.
Figure 6:
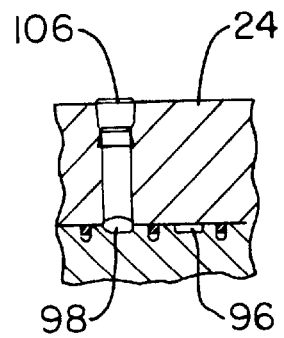
FIG. 6 is a cross sectional view of the actuation inlet for the clutch assembly of the invention.

It will be appreciated that the passage of actuation, lubrication and cooling fluid or oil from external to the hydraulically actuated power takeoff clutch assembly 10 to the interior thereof is achieved by a rotary union. The circumferential grooves 96, 98 in the circumferential surface of the rotating output shaft 28 communicate with inlets in the bearing cover 24. As shown in FIG. 5, an inlet 104 passes through the bearing cover 24 and communicates with the circumferential groove 96 carrying lubrication fluid. In like manner, an inlet 106 passes through the bearing cover 24 and communicates with the circumferential groove 98 to convey hydraulic fluid. As shown in FIG. 3, the lubricating fluid which is introduced into the bore 92 passes through lubrication paths 108 to the disk stack 78, 80 comprising the clutch of the hydraulic power takeoff assembly 10. The paths 108 assure that cooling fluid reaches the clutch stack and lubricates the associated bearings of the clutch assembly, as would be readily appreciated by those skilled in the art. As shown in FIG. 2, the hydraulic fluid introduced through the input 106 and into the bore 94 passes through a bore 110 to introduce the pressurized hydraulic fluid into the cavity between the backplate 66 and piston 70.

With further reference to FIG. 2, it can be seen that tapered roller bearings 112, 114 are interposed between the bearing cover 24 and output shaft 28 for purposes of supporting and maintaining the rotating shaft 28. In the preferred embodiment of the invention, the tapered roller bearings 112, 114 are spring biased to prevent axial movement or vibration which would adversely affect the rotary union at the seals 113 associated with the circumferential grooves 96, 98 and inlets 102, 104.

A shaft seal 116 is provided about the shaft 28 and an end of the bearing cover 24 and is retained there by an end collar or seal cover 118. It will be readily appreciated by those skilled in the art that a number of other internal seals are employed in the context of the invention as shown in the drawings but not described. Their implementation, positioning and use would be readily appreciated by those skilled in the art and such is not critical for an understanding or appreciation of the concept of the instant invention.

It should be readily appreciated that the hydraulically actuated power takeoff clutch assembly 10 is secured to the flywheel housing 18 of an engine or other power source by means of bolts 16, or the like. At times, however, servicing of the clutch assembly, to repair worn parts and the like, may be desired. It is most advantageous in this regard for the clutch assembly be removable from the hydraulically actuated power takeoff clutch assembly 10, without necessitating removal of the assembly 10 from the flywheel housing 18 and without disturbing the associated pumps and hoses. In this regard, it will be appreciated that removal of the bolts 26 allows for removal of the shaft 28, bearing cover 24, clutch plates 78, 80, piston 70 and backplate 66, all retained to the shaft 28 by means of the end plate 26 and bolt 58. Servicing of that clutch module may then be easily undertaken and replacement thereof easily achieved in the field.

Figure 7:
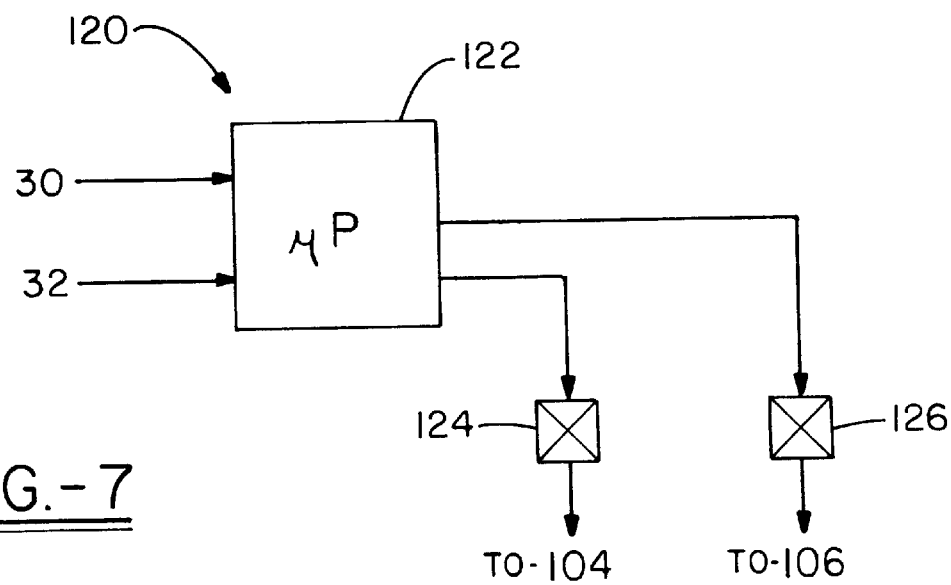
FIG. 7 is a schematic diagram of the control unit of the invention.

It is contemplated that the hydraulically actuated power takeoff clutch assembly 10 of the invention is electronically controlled as by a control circuit 120 shown in FIG. 7. As illustrated therein, a microprocessor or control chip 122 receives input signals from the speed transducers 30, 32 respectively corresponding to the instantaneous speed of the flywheel 40 and output shaft 28. The microprocessor 122 also controls a control valve 124 which is connected to the inlet 104 to provide lubrication to the clutch, seals and bearings of the assembly 10. Similarly, the control chip 122 regulates a control valve 126 for selectively applying hydraulic pressure through the inlet 106 to the piston or pressure plate 70 to control actuation of the clutch.

It will be readily appreciated by those skilled in the art that the utilization of a microprocessor or controller chip 122 allows the hydraulically actuated power takeoff clutch assembly 10 to couple high inertia loads to an engine and to effect a start up without stalling the engine. In that regard, the microprocessor 122 can momentarily actuate the clutch 78, 80 by momentarily opening the valve 126 to start rotation of the shaft 28. If the speed sensor 32 senses that the shaft 28 has not commenced a rotational speed of a particular threshold, it may determine that the shaft 28 is jammed or otherwise locked and may signal the operator accordingly. If the shaft 28 has begun to rotate, the microprocessor 122 may cause the valve 126 to again open momentarily to "bump" the clutch again to impart more speed to the shaft 28 and, upon sensing that the speed of the shaft has increased further, the microprocessor 122 may then effect full closure of the clutch to bring the output shaft 28 up to the rotational speed of the flywheel 40.

Various types of start-up routines could be envisioned by those skilled in the art to ensure that the shaft 28 is brought up to an operational speed without excessively loading or stalling the engine.

It is also contemplated that only the speed sensor 30, which could be simply the engine tachometer, may be employed and monitored for the engagement technique. Here, the microprocessor 122, upon sensing that the engine (flywheel) speed has dropped below a threshold, may cause the clutch to momentarily disengage, allowing the engine speed to recover and the clutch to cool prior to subsequent re-engagements or bumping until the engine speed does not drop below the threshold, but accelerates to its operational speed.

The speed sensors 30, 32 can also be employed to monitor any slippage of the disks of the clutch 78, 80. It will be appreciated by those skilled in the art that the clutch 78, 80 serves as a rudimentary torque limiting clutch, having a characteristic break-away torque dependent upon the frictional characteristics of the disks 78, 80 and the applied hydraulic pressure. The speed transducers 30, 32 allow the microprocessor 122 to monitor any slippage in the clutch and to take any necessary remedial action.

Figure 9:
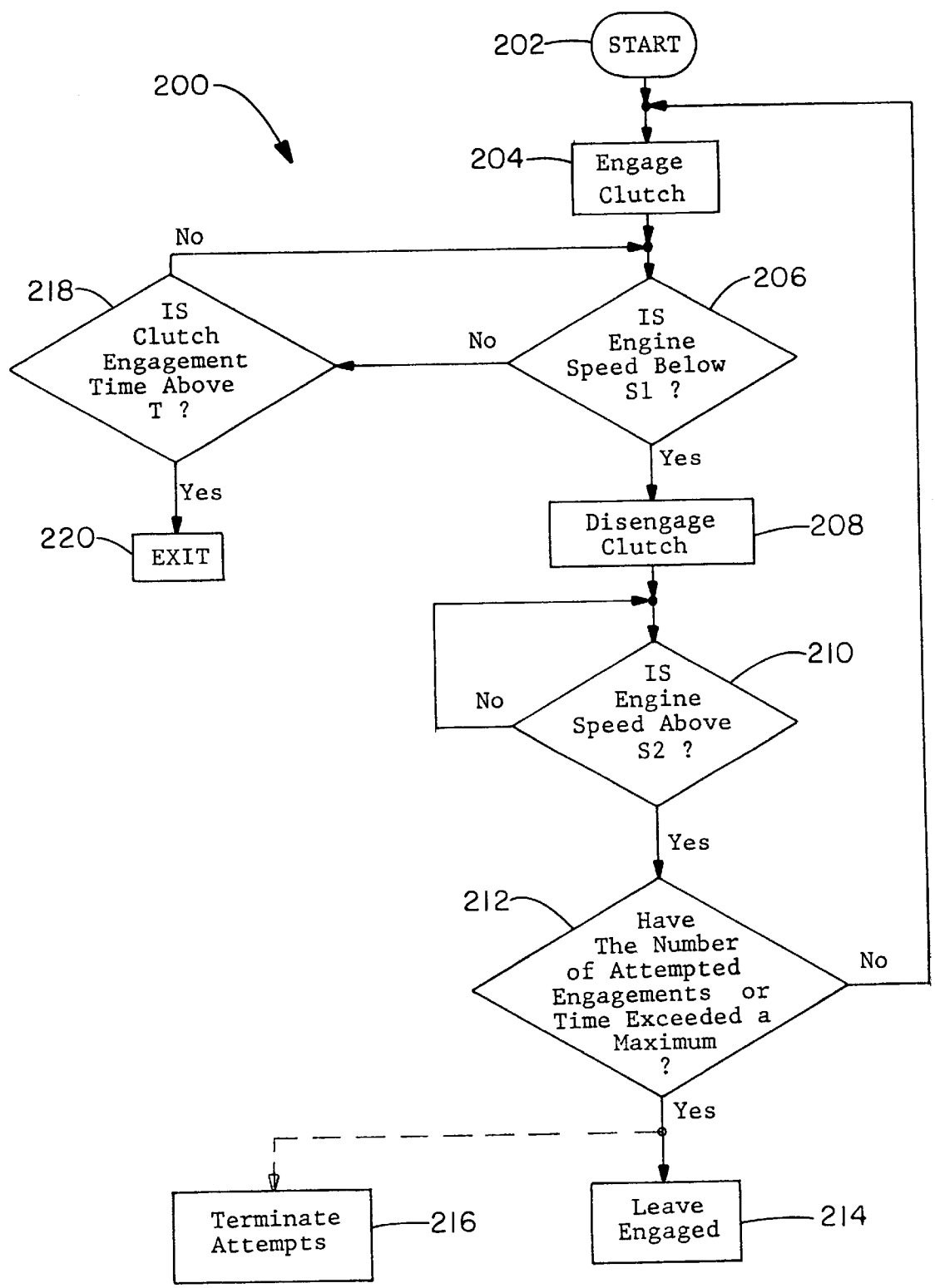
FIG. 9 is a flow chart of a clutch engagement routine according to the invention.

The invention specifically contemplates that the safe and effective engagement of a power source with a load may be attained in a step wise fashion without stalling the power source, overheating the clutch, or damaging the load. It is contemplated that this step wise approach to engagement may be attained through any of numerous types of clutches, whether they be hydraulic, pneumatic, electrical or mechanical. In that regard, reference is made to FIG. 9 wherein a flow chart depicting the desired clutch actuation is designated generally by the numeral 200. The process is entered at 202 for engagement of the clutch as at 204. Again, as will be readily appreciated by those skilled in the art, the process of clutch engagement 200 is applicable to clutches of various types and configurations. When the clutch is engaged at 204, determination is made at 206 as to whether or not the engine speed is below a first threshold S1. As shown, the clutch remains engaged so long as the engine speed remains above S1. If, however, the engine speed drops below S1, the clutch is disengaged as at 208. The clutch then remains disengaged until the engine speed has risen to exceed a second threshold S2 as at 210. When the engine speed has recovered to S2, a determination is made at 212 as to whether either the number of attempted engagements of the clutch or a time period for such attempted engagements has exceeded a certain maximum level. If either do, indicating that either an excessive number of attempts or amount of time has been employed to engage the clutch, without success, action is either taken at 214 to leave the clutch engaged or at 216 to terminate attempts at engagement as shown in phantom. Whether the system or process 200 employs remained engagement 214 or termination of effort at 216 is a matter of design choice. If the condition at 212 is indicative of a system problem, termination 216 may be employed. However, in most applications the clutch can simply be left engaged at 214 while the engine recovers to operating speed.

As shown, when the clutch is engaged and the engine speed does not drop below the level S1 within a period of time T, as determined at 218, it is indicative of the fact that a successful engagement of the clutch has been made and the routine is terminated at 220.

As can be seen, the process of the instant invention assures that when clutch engagement is made, it is terminated at any time that the engine speed bogs to a certain level and engagement is not again attempted until the engine speed recovers to a level S2. After a certain number or period of time for such attempts, the clutch is either left engaged or, alternatively, attempts at engagement are terminated. When the clutch is engaged and the engine speed does not drop below the level S1 for a time period T, it is indicative of successful engagement and the process is terminated.

Following the process 200, successful engagement between a power source and a load can be made through a clutch by successive attempts at engaging the clutch while assuring that the engine speed does not drop below a level that could result in a stall. By limiting the number of attempts at engagement and the period of time between attempted engagements, it can be assured that the clutch does not overheat during the engagement attempts.

Figure 10:
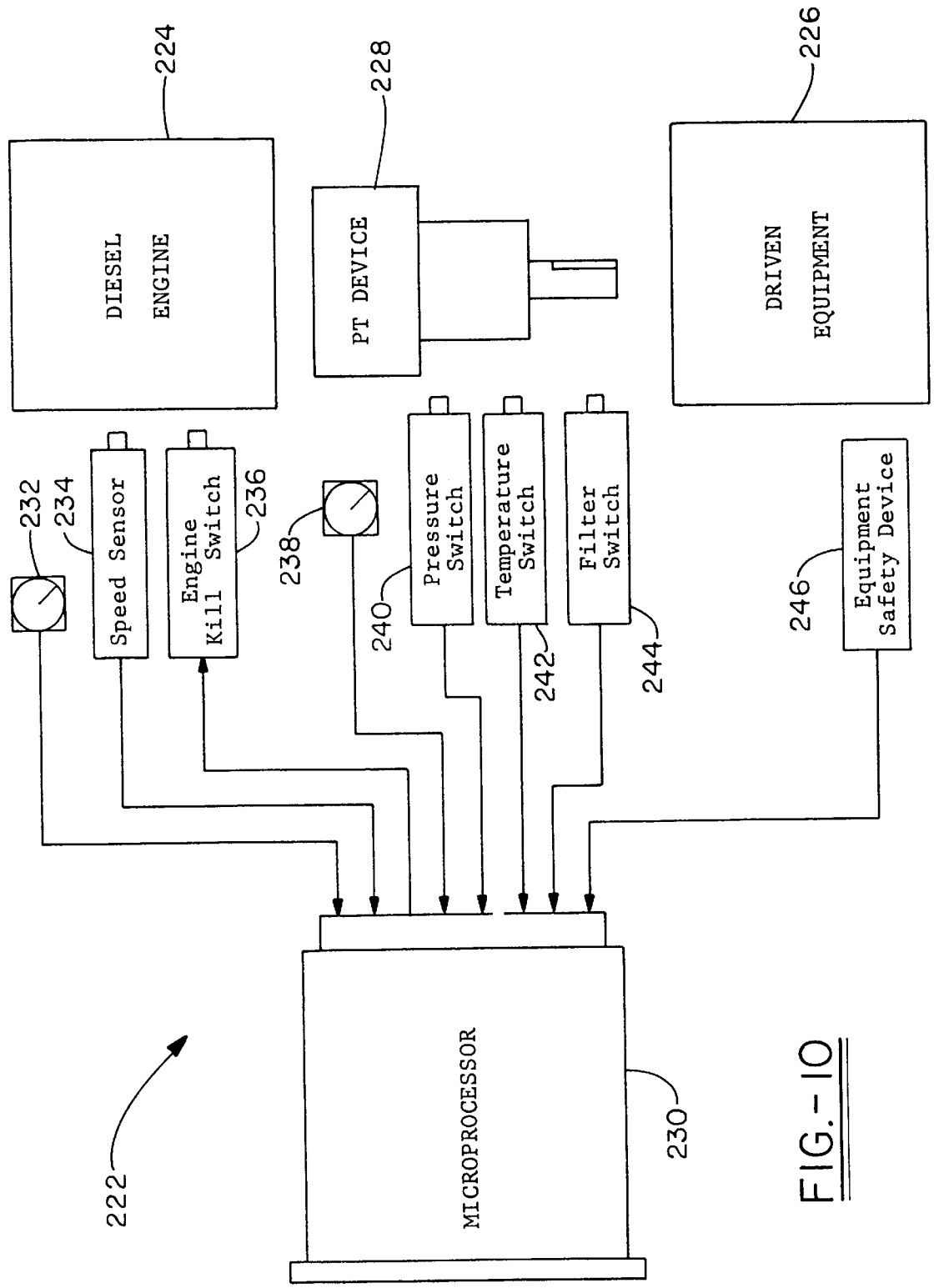
FIG. 10 is a block diagram of a power system monitoring device accordingly to the invention.

The invention also contemplates a monitoring and diagnostic system that interfaces with the clutch, power source and load to assure safe, effective and efficient operation thereof. The system so contemplated is shown in FIG. 10 as designated by the numeral 222. The system shows a power source such as a diesel engine 224 adapted to be interconnected with a load 226 by means of the actuation of clutch 228. The devices 224–228 have associated switches or sensors which communicate with a controlling microprocessor or the like 230. Associated with the power source 224 is an engine ignition switch 232, a speed sensor 234 and a shut-off or "kill" switch 236. Associated with the clutch 228 is a clutch engagement switch and associated solenoid 238, and an oil pressure switch 240, temperature switch 242 and filter switch 244. A safety switch 246 is associated with the load 226.

As shown in FIG. 10, the switches or sensors 232, 234 and 238–246 supply data to the microprocessor 230. The kill switch 236 is, in turn, controlled by the microprocessor 230 to shut down the power source 224. It will be appreciated that the various sensors associated with the power source, clutch and load of the system 222 provide a wealth of information to the microprocessor 230 to allow the microprocessor to monitor the operation of the associated system, record appropriate data, and take appropriate controlling actions.

Figure 11A:
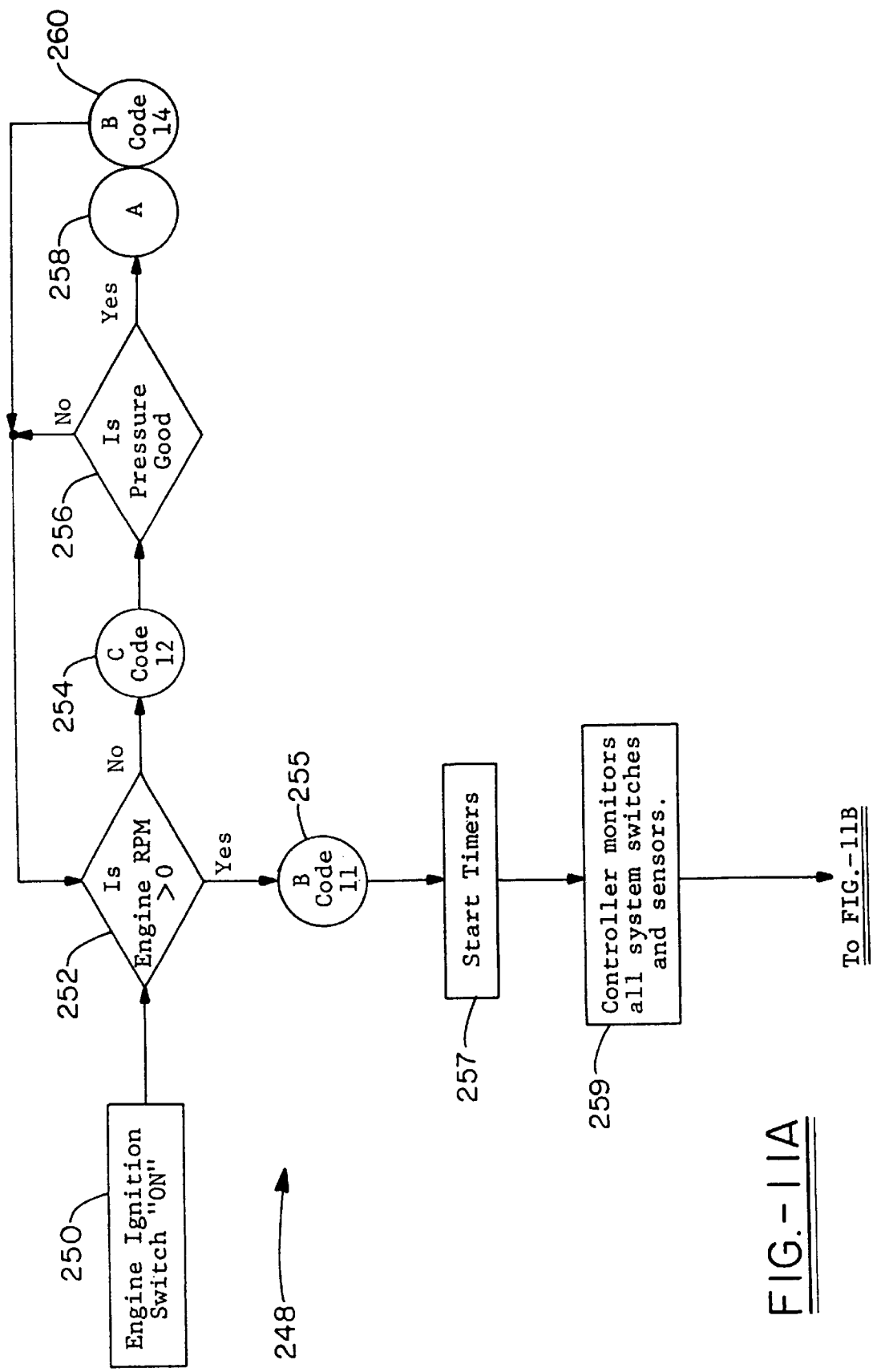
Figure 12:
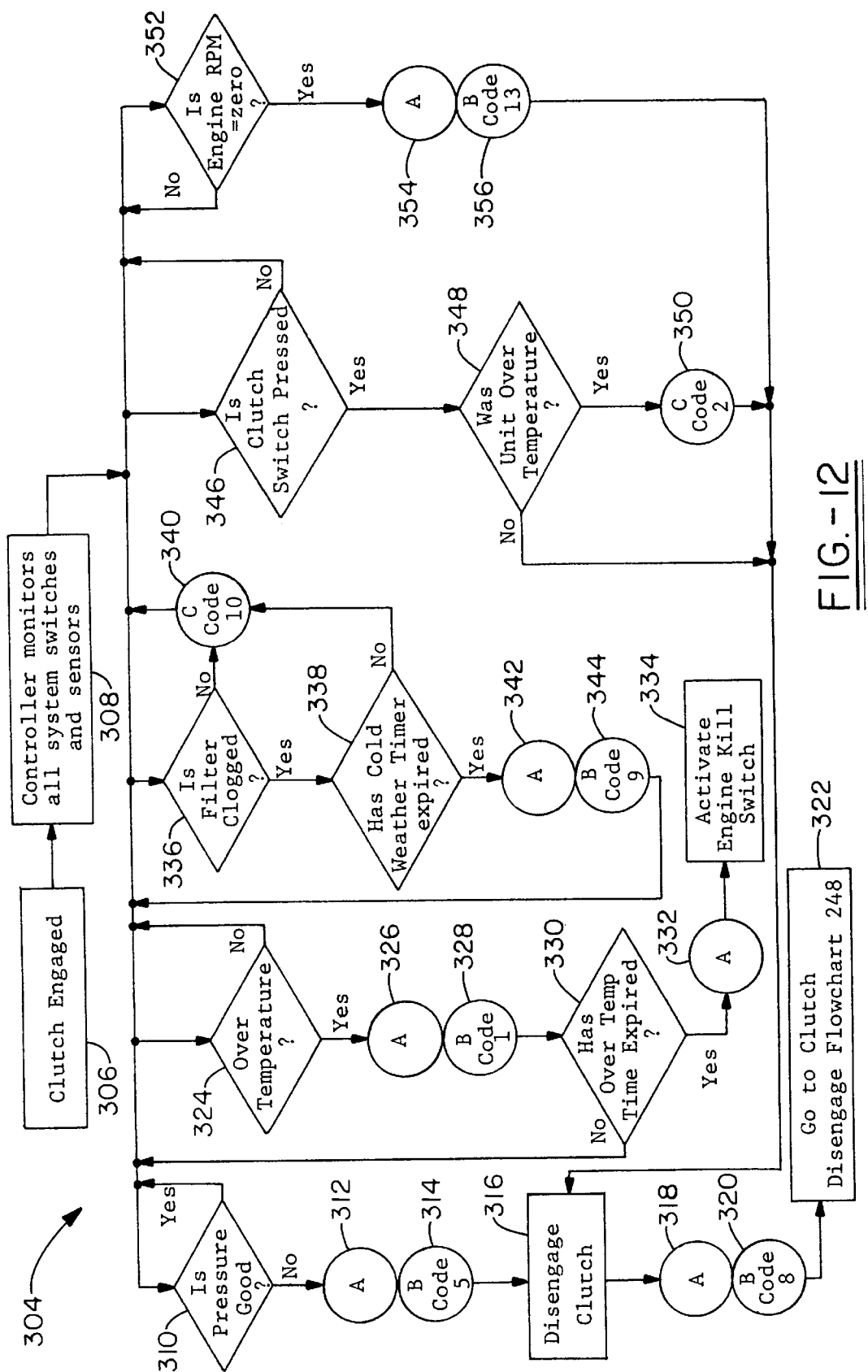
FIG. 12 is a flow chart of the diagnostic and control system of the invention at clutch engagement.

With reference now to FIGS. 11 and 12, an appreciation of the data acquisition and control process undertaken with the system 222 can be attained. The flow chart of FIGS. 11 and 12 contain certain numeric and alphabetic codes, as set forth below in Tables I and II.

TABLE I

ALPHABETIC CODES

| | |
|---|---|
| A | Display system conditions to operator |
| B | Store condition in microprocessor; record date and time of occurrence |
| C | If condition previously existed, record date and time when condition was removed |

TABLE II

NUMERIC CODES

| | |
|---|---|
| 1 | Clutch enters over temperature |
| 2 | Clutch disengaged when over temperature |
| 3 | Low oil pressure with clutch disengaged |
| 4 | Low oil pressure removed with clutch disengaged |
| 5 | Low oil pressure with clutch engaged |
| 6 | Lockout timer activated |
| 7 | Clutch engaged |
| 8 | Clutch disengaged |
| 9 | Oil filter clogged |
| 10 | Oil filter clog removed |
| 11 | Engine rpm rises above zero |
| 12 | Engine rpm drops to zero |
| 13 | Shock load jam |
| 14 | Oil pressure switch bypassed |
| 15 | Engine speed rises above idle speed with clutch disengaged |
| 16 | Engine speed falls back to idle speed with clutch disengaged |

With specific reference to FIG. 11, it can be seen that a process of the invention with the clutch disengaged is designated generally by numeral 248. With the engine ignition switch on at 250, a determination is made at 252 as to whether the engine rpm is greater than zero. In other words, is the engine running? If the engine is not running, codes C and 12 are engaged at 254 and a determination is made at 256 as to whether the clutch oil pressure as sensed by this pressure switch 240 is acceptable. If it is not, the process loops back to 252 to monitor engine speed. If the pressure reads as being acceptable, then codes A, B and 14 are engaged by the microprocessor 230 at 258, 260. In other words, the condition is displayed to the operator and it is recorded as to date and time. Finally, the fact that the oil pressure switch has been bypassed is recorded by the microprocessor since the only conceivable way that acceptable pressure could be registered with the engine not running is if the oil pressure switch or sensor 240 has been bypassed.

If the engine rpm is greater than zero as determined at 252, codes B and 11 are engaged at 255 to record both the time and date of the occurrence that the engine was started. At the same time, timers associated with the microprocessor 230 are started at 257 and the microprocessor then monitors all system switches and sensors as 259.

At 261, a determination is made as to whether or not the oil pressure of the clutch 228 is acceptable. If it is not, codes A, B and 3 are engaged as at 262, 264, with the condition being displayed to the operator and the date and time of the occurrence being recorded. The condition is indicative of low oil pressure with the clutch disengaged. As a consequence, the microprocessor inhibits engagement of the clutch at 266 by inhibiting actuation of the switch 238. If, however, the pressure is sensed as being good as at 261, codes C and 4 are engaged, indicating that the oil pressure is acceptable and recording the date and time of that occurrence if previously the pressure had been unacceptable. This engagement of codes C and 4 is undertaken at 268 and, accordingly, the pressure conditions for engagement of the clutch have been satisfied.

At 270, a determination is made as to whether the clutch 228 is overheated. If it is not, the temperature parameter is satisfied for clutch engagement. If, however, the temperature is deemed excessive, codes A, B and 1 are engaged at 272, 274 and engagement of the clutch is inhibited as at 266. In other words, while inhibiting actuation of the clutch engagement switch 238, the condition is displayed to the operator, the date and time of the occurrence is recorded, and the occurrence is noted as being an over temperature clutch.

Attention is also given to whether the oil filter for the clutch 228 is clogged. This assessment is made at 276 and, if it is not deemed clogged, codes C and 10 are engaged at 278, indicating the date and time that a clogged condition, if preexistent, was removed, and the clutch is otherwise readied for engagement. If the filter indicates a clogged situation at 276, a determination is made at 280 as to whether or not a timer, used during cold weather, has expired. Since thick oil present during cold weather may give the same indications as a clogged filter, when the cold weather timer has expired and the filter still appears clogged, codes A, B and 9 are engaged at 282, 284 indicating to the operator that the filter is clogged, and recording the time and date that the determination was made. It will be noted that a clogged filter is not a basis for preventing the clutch from being engaged, but the indication is made to the operator that the filter needs to be changed.

At 281, a determination is made as to whether the equipment safety switch 246 has been activated. If it has, the condition is displayed to the operator as at 283 and the clutch is inhibited from engagement through the clutch engagement switch 238 at 285. It will also be noted that irrespective of the pressure, temperature, or state of filter as monitored at 260, 270, and 276, if too many attempts have been made at engaging the clutch, as determined at 286, that condition is displayed to the operator at 288, recorded as to the time and date at 290, and a lockout timer associated with the microprocessor 230 is commenced. The lockout timer sets a period of time during which the clutch must remain disengaged before any further engagements can be made. However, in the event that the number of clutch engagement attempts does not exceed a threshold, the clutch is engaged as at 292 and such is displayed to the operator as at 294 and the event is recorded as to date and time at 296.

With further reference to FIG. 11, it can be seen that the engine rpm is continually monitored as at 298. If the engine speed is determined to be greater than idle speed, codes B and 15 are engaged at 300, indicating that the engine speed, with the clutch disengaged, has risen above idle speed, with the time and date of the occurrence being recorded. In the event that the engine speed is below idle speed, indicating that engine speed has fallen back to idle speed with the clutch disengaged, the time and date of that occurrence is recorded at 302.

Referring now to FIG. 12, the control and data acquisition methodology employed during clutch engagement is shown as designated generally by the numeral 304. With the clutch engaged at 306, the microprocessor 230 monitors and controls the various sensors and switches 232–246 as indicated at 308. One parameter that is assessed is oil pressure by means of the pressure switch 240. If a determination is made at 310 that the pressure is acceptable, the clutch remains engaged. If not, codes A, B and 5 are engaged since the condition of low oil pressure with the clutch engaged is signaled to the operator and recorded as to time and date at 312, 314. The clutch is then disengaged at 316 as through the clutch engagement switch 238 and the notification of such disengagement is displayed to the operator and recorded as to time and date at 318, 320. The process is then reverted at 322 to the process 248 presented in FIG. 11 and described above.

The operating temperature of the clutch is also monitored as at 324. If the clutch temperature is at an acceptable level, the clutch remains engaged. If it is determined that the clutch is at a temperature above a set threshold, codes A, B and 1 are engaged such that the condition of over temperature is displayed to the operator and the date and time of the occurrence is recorded at 326, 328. At the time that the excessive temperature is noted a timer associated with the microprocessor 230 is activated and a determination is made at 330 as to whether a certain time period of excessive temperature has been experienced. If it has, the condition is indicated to the operator at 332 and the power source is shut off at 334.

During operation of the system with the clutch engaged, the condition of the filter associated with the clutch is also monitored at 336. If it is determined that the filter is not clogged, or that it appears clogged but the cold weather timer associated with the microprocessor 230 has not timed out as at 338, the clutch remains engaged and, in the event that the filter had previously been clogged and the problem remedied, codes C and 10 are engaged at 340 for recording the time and date that the clogged filter condition was removed.

In the event that the filter appears clogged at 336 and the cold weather timer has expired at 338, indicating that the condition experienced is the result of a clogged filter and not a cold ambient temperature, codes A, B and 9 are engaged at 342, 344 in which the clogged filter condition is displayed to the operator and the time and date of the monitoring of the condition is recorded.

The process 304 allows the operator to disengage the clutch during operation for any purpose that the operator deems appropriate. More particularly, the operator may determine to disengage the clutch when a temperature problem is sensed, and before the over temperature timer has expired as in process loop 324–334.

The clutch engagement switch 238 is of such a nature that the switch successively engages and disengages the clutch. In other words, actuation of the switch 238 changes the state of clutch engagement. At 346, it is determined whether the clutch switch 238 has been activated. If not, the clutch remains engaged. If it has, the clutch is disengaged. At the time of disengagement, the determination is made a 348 as to whether the clutch was above a threshold temperature as determined through the temperature switch 242. If the clutch was over temperature, codes C and 2 are engaged such that the clutch is disengaged and a record is made as to the time and date of such disengagement. Accordingly, there is a record made at 350 of actions taken by the operator in response to thermal problems.

During the period of clutch engagement, the speed of the power source or engine is monitored as at 352. If the speed of the power source remains above a threshold level, such as zero or the like, the clutch remains engaged. If, however, the speed of the power source or engine drops to zero or below a threshold, codes A, B and 13 are engaged at 354, 356 indicating a shock load jam of the power source to the operator and recording the time and date of the occurrence. The clutch is then disengaged as at 316. With the data acquired through the process 248, 304, a host of information is available to the owner of the equipment as to the nature and extent of problems encountered and the propriety of the activities of the operator. Among the things that can be determined is the number of over temperature occurrences, the length of time in an over temperature situation before the operator disengages the clutch, the number of low pressure occurrences at idle, the length of time before an operator shuts down the system due to pressure loss while the clutch was disengaged, the number of low pressure occurrences while the clutch was engaged, the number of times that the lockout timer was activated because the operator attempted too many unsuccessful engagements of the clutch, the number of clutch engagements, the length of time the system was allowed to run with a clogged filter, the number of clogged filter occurrences, the hours of engaged operation, the hours of engine operation, the hours of disengaged operation, the number of shock load jams, the number of times the pressure switch was bypassed by the operator, and the amount of time that the engine operated at a high speed while the clutch was disengaged. This information can be used by the owner of the equipment to take appropriate remedial action either with the equipment itself or the operator. Moreover, the information may be used to determine the validity of warranty claims.

Thus it can be seen that the objects of the invention have been satisfied by the structure presented above. While in accordance with the patent statutes, only the best mode and preferred embodiment of the invention has been presented and described in detail, the invention is not limited thereto or thereby. Accordingly, for an appreciation of the true scope and breadth of the invention reference should be made to the following claims.

What is claimed is:

1. A method for operationally interconnecting a power source and a load through a clutch, comprising:

engaging the clutch;

monitoring the speed of the power source;

sequentially disengaging the clutch if the speed of the power source drops below a first threshold and re-engaging the clutch if the speed of the power source exceeds a second threshold; and wherein the sequence of disengaging and re-engaging the clutch is terminated and the clutch remains engaged after a fixed number of attempts at re-engaging have been made.

2. A method for controlling and monitoring the operative interengagement of a power source and load through a clutch, comprising:

sensing the speed of the power source;

sensing the oil pressure and temperature of the clutch;

controlling the engagement and disengagement of the clutch as a function of said speed, oil pressure and temperature; and determining if a clutch pressure switch has been bypassed from a relationship between said speed of the power source and said oil pressure.

3. The method according to claim 2, further including the step of precluding attempts at clutch engagement when at least one of said oil pressure or temperature fails to satisfy a predetermined standard.

4. A method for operationally interconnecting a power source and a load through a clutch, comprising:

engaging the clutch;

monitoring the speed of one of the power source and the load;

sequentially disengaging the clutch if the monitored speed drops below a first threshold and re-engaging the clutch if the monitored speed exceeds a second threshold; and wherein the sequence of disengaging and re-engaging the clutch is terminated and the clutch remains engaged after a fixed number of attempts at re-engaging have been made.

5. A method for operationally interconnecting a power source and a load through a clutch, comprising:

engaging the clutch;

monitoring the speed of one of the power source and the load;

sequentially disengaging the clutch if the monitored speed drops below a first threshold and re-engaging the clutch if the monitored speed exceeds a second threshold; and wherein no sequence of disengagement and re-engagement is entertained once the monitored speed remains above said first threshold for a set period of time.

6. A method for operationally interconnecting a power source and a load through a clutch, comprising:

engaging the clutch;

monitoring the speed of one of the power source and the load;

sequentially disengaging the clutch if the monitored speed drops below a first threshold and re-engaging the clutch if the monitored speed exceeds a second threshold; and wherein attempts at re-engagement are terminated following one of a set period of time and a number of attempted engagements.

7. The method according to claim 6, further including the step of disengaging the clutch when conditions warrant such disengagmeent, but an operator has failed to do so.

8. A method for controlling and monitoring the operative interengagement of a power source and load through a clutch, comprising:

sensing the speed of the power source;

sensing the oil pressure and temperature of the clutch;

controlling the engagement and disengagement of the clutch as a function of said speed, oil pressure and temperature; and determining at least one of the number of over temperature occurrences, the length of time in an over temperature situation before the operator disengages the clutch, the number of low pressure occurrences at idle, the length of time before an operator shuts down the system due to pressure loss while the clutch was disengaged, the number of low pressure occurrences while the clutch was engaged, the number of times that the lockout timer was activated because the operator attempted too many unsuccessful engagements of the clutch, the number of clutch engagements, the length of time the system was allowed to run with a clogged filter, the number of clogged filter occurrences, the hours of engaged operation, the hours of engine operation, the hours of disengaged operation, the number of shock load jams, the number of times the pressure switch was bypassed by the operator, and the amount of time that the engine operated at a high speed while the clutch was disengaged.

* * * * *